United States Patent [19]

Bodnar

[11] 4,004,479
[45] Jan. 25, 1977

[54] SCRAP CHOPPER

[76] Inventor: Ernest Robert Bodnar, 29 Blackdown Crescent, Islington (Toronto), Ontario, Canada

[22] Filed: Feb. 5, 1975

[21] Appl. No.: 547,365

[52] U.S. Cl. .................................. 83/345; 83/347; 83/674

[51] Int. Cl.² ......................................... B23D 25/12

[58] Field of Search ............ 83/343, 344, 345, 346, 83/347, 356.3, 674, 665

[56] References Cited

UNITED STATES PATENTS

| | | | |
|---|---|---|---|
| 1,985,821 | 12/1934 | Field | 83/343 X |
| 2,951,410 | 9/1960 | Brown | 83/345 X |
| 3,205,744 | 9/1965 | Huck | 83/345 |
| 3,274,873 | 9/1966 | Sauer | 83/347 |
| 3,405,580 | 10/1968 | Hallden | 83/343 X |
| 3,438,835 | 4/1969 | Chen et al. | 83/345 X |
| 3,709,077 | 1/1973 | Trogan et al. | 83/345 X |
| 3,828,636 | 8/1974 | Smith | 83/345 X |

Primary Examiner—Willie G. Abercrombie

[57] ABSTRACT

A rotary chopper having upper and lower chopper rolls, in which the rolls run in contact with one another, with the chopper blades being formed flush with the surface of the rolls, the surface of the rolls between the chopper blades being formed of a relatively hard stiff resilient material, of such a nature, that at least adjacent to the location of the chopper blades themselves, it may be deflected inwardly to accomodate the overlap of the chopper blades, and then will spring outwardly again so as to constitute the smooth cylindrical surface of the roll. In this way, the scrap edge portion of the strip is permanently gripped between the nip of the rolls at all times, and at the same time the fan-like action of the blades is eliminated, since they are flush with the surface of the rolls.

5 Claims, 5 Drawing Figures

SCRAP CHOPPER

The invention relates to apparatus for chopping scrap sheet metal strips. In particular, it relates to the chopping of sheet metal strips of narrow gauge which are easily bent or crumpled, and are difficult to feed to the chopper, although the invention is not exclusively restricted to such narrow gauge strips.

BACKGROUND OF THE INVENTION

In the preparation of strip sheet metal for subsequent use, the edges of the rolled sheet metal strips are often discarded as scrap. For example, when thin sheet metal is being slit into separate strips for use in making for example beverage cans or the like, the edges of the strip will often be wrinkled and jagged and will be unsuitable for production. Accordingly, as they leave the slitter or trimmer, the two edge strips are passed through rotary choppers which simply chop the strips up into short lengths of typically six to twelve inches which are then collected in a waste receptacle and returned to the mill as scrap.

In the past, such rotary choppers have consisted of a drum member provided, typically with two or three radially extending blades. Two such drums one above and one beneath the strip were provided, and the blades on the two drums were arranged to overlap so as to provide a shearing action on the strips. Such prior art choppers have been, generally speaking, adequate for use with the thicker gauges of strip sheet metal. However, they are found to be unsuitable for various reasons, for use with thinner gauges of sheet metal such as are now coming into wider usage for example in the manufacture of beverage cans. One of the problems of such prior art rotary choppers is the fact that no satisfactory method had been developed for continuously feeding the scrap edge strip to the chopper blades. Thus when using a thinner more flexible strip, it was possible for the scrap edge portion to become deflected so that it did not in fact reach the chopper blades, but became bent and crumpled up. This would then require shutting down the line while the crumpled portion was removed, and then restarting it again.

In addition, as the speed of the entire line was increased, the rotation of the upper and lower drums, with their blades extending outwardly from the drum surface, acted somewhat like a fan and created air currents which tended to deflect the scrap edge portions of the strip causing them to flutter or shake, so that they frequently became deflected from between the upper and lower drums, again causing a misfeed and involving shutting down the line while the crumpled or deflected scrap edge portion was cleared up.

BRIEF SUMMARY OF THE INVENTION

The invention therefore seeks to overcome the foregoing disadvantages by the provision of a rotary chopper having upper and lower chopper rolls, in which the rolls run in contact with one another, with the chopper blades being formed flush with the surface on the rolls, the surface of the rolls between the chopper blades being formed of a relatively hard stiff resilient material, of such a nature, that at least adjacent to the location of the chopper blades themselves, it may be deflected inwardly to accommodate the overlap of the chopper blades, and then will spring outwardly again so as to constitute the smooth cylindrical surface of the roll. In this way, the scrap edge portion of the strip is permanently gripped between the nip of the rolls at all time, and at the same time the fan-like action of the blades is eliminated, since they are flush with the surface of the rolls.

More particularly, it is an objective of the invention to provide a scrap chopper having the foregoing advantages in which segments of the rolls may be removed so as to adjust and position the blades.

More particularly, it is an objective of the invention to provide a scrap chopper having the foregoing advantages in which the cutting blades are formed of steel bars having an essentially rectangular cross section, and including releasable attachment means for attaching and adjusting them in the rolls in at least two and preferably four different positions so as to make use of at least two and preferably four edges of the bar one after the other.

It is a further and related objective of the invention to provide a scrap chopper having the foregoing advantages which is additionally provided with anti-backlash gearing, including adjustment means for taking up any backlash in the gearing system, so as to enable precise adjustment of the meshing of the cutting blades to be achieved.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF A SPECIFIC EMBODIMENT

Figure 1:
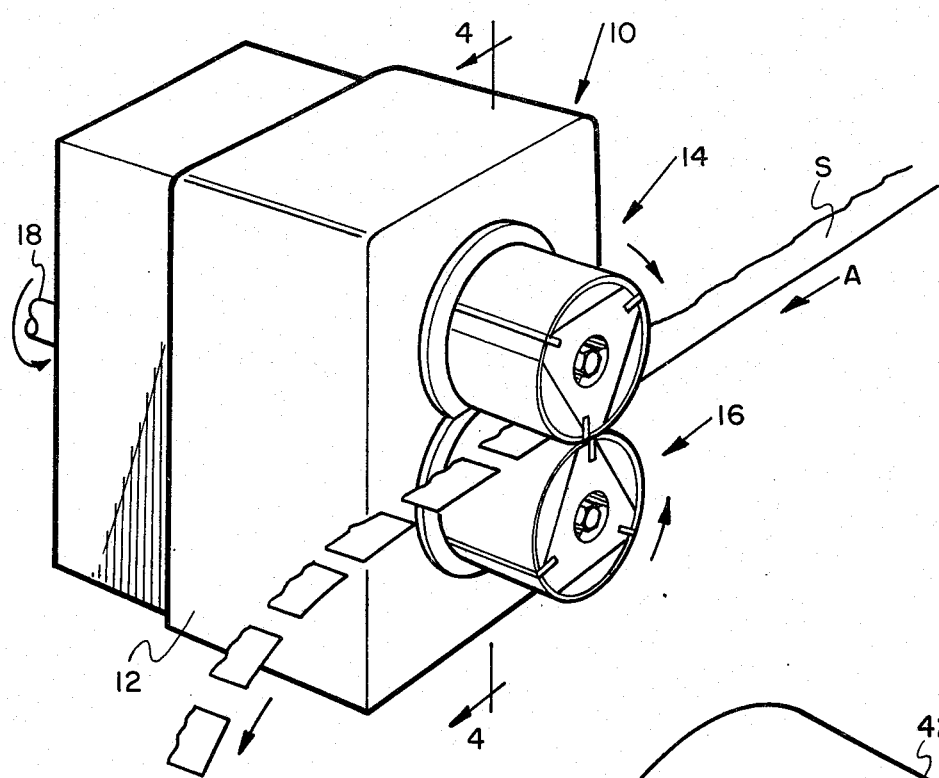
FIG. 1 is a perspective illustration showing a scrap chopper according to the invention.

Referring now to FIG. 1, it will be seen that the scrap chopper according to the invention is shown generally as 10 consisting of a housing 12, and upper and lower chopper rolls 14 and 16 driven through a single drive shaft 18 extending out of the rear of housing 12. The scrap edge portion of the steel strip is shown as S, passing between the upper and lower rolls 14 and 16. It will of course be appreciated that the remaining portion of the strip metal is not shown, for the sake of simplicity. The strip S as shown is merely the scrap edge portion as trimmed off at a cutter or slitter, forming part of the complete sheet metal working line (not shown).

It will of course be appreciated that the scrap edge portion S is moving in the direction of the arrow A at a continuous adjustable steady speed, which may typically be up to six thousand feet per minute. As will be seen from FIG. 1, the strip S is unsupported and once it is chopped up by the chopper 10, it is then no longer subject to any continuous traction pulling it through the sheet metal working line.

Figure 2:
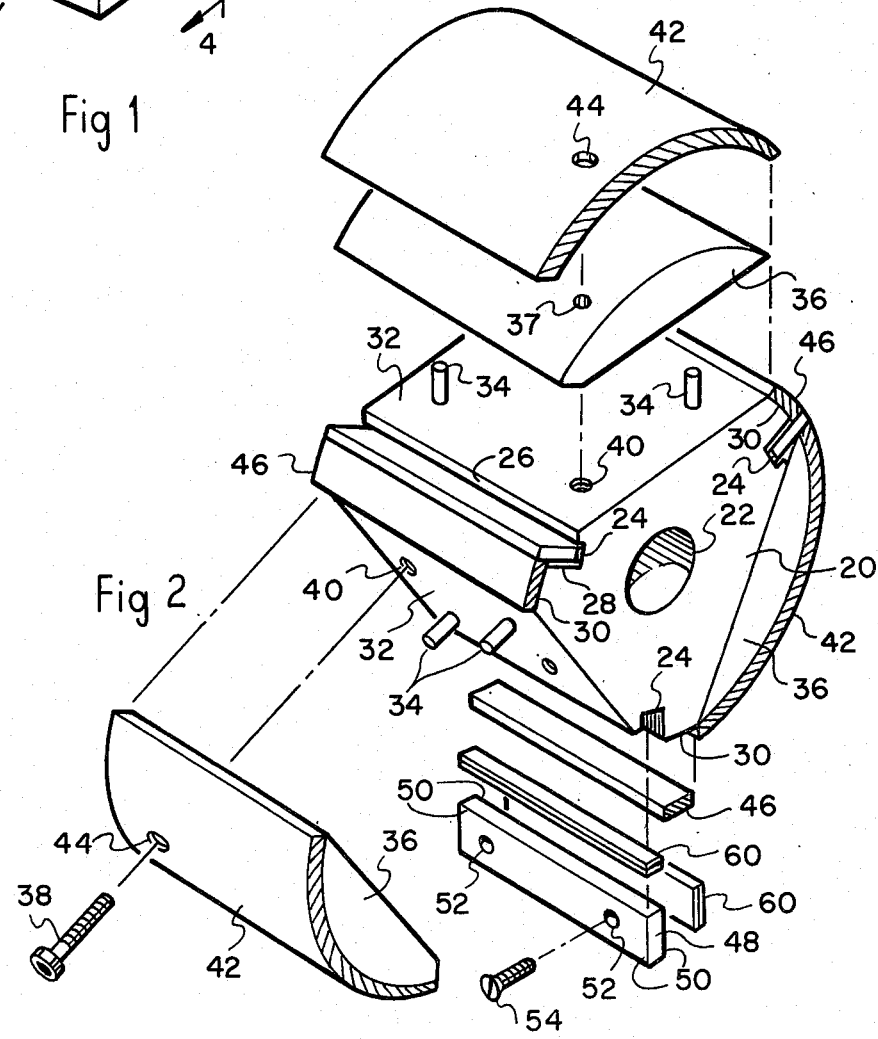
FIG. 2 is an exploded perspective illustration showing the construction of one of the rolls of the scrap chopper of FIG. 1.
Figure 3:
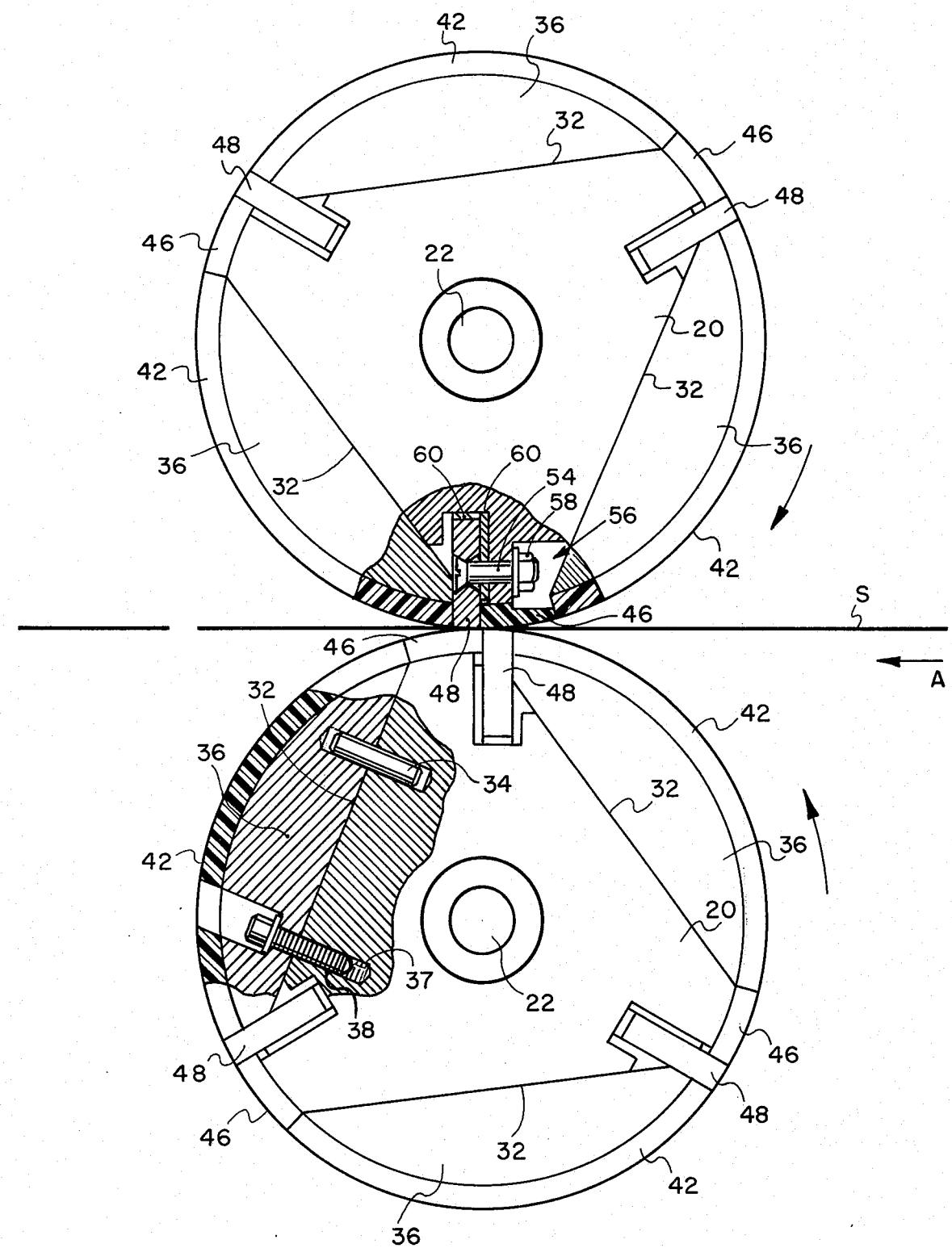
FIG. 3 is a greatly enlarged end elevation of the scrap chopper rolls partially cut away.

According to the present invention, the problem of controlling the strip S may be overcome by the use of chopper rolls 14 and 16 in which the blades are located more or less flush with the cylindrical frictional surface of the roll and the other inventive features as claimed herein. This type of construction is shown in FIGS. 2 and 3. According to this particular example of the invention, a chopper roll 14 or 16 may be made up with a cylindrical surface in the following manner. A central solid core 20 is formed of steel, having an essentially generally triangular shape in cross section and a central bore 22. At each corner of the triangular shape of the core 20, a blade receiving groove 24 is formed, preferably having one side 26 lower than the other side 28. The surface of the core adjacent the high side 28 of the groove 24 is formed into an arc having a predetermined radius concentric with the center of the bore 22.

The core 20 defines three flat generally rectangular shaped surfaces 32, preferably provided with registering means such as dowel pins 34 or any other suitable means. In order to form a completely cylindrical roll surface, three arcuate segments 36 of any suitable material are provided, having bores therein for receiving the dowel pins 34, and having further bores 37 for receiving attachment bolts 38. Bolts 38 fit within the threaded recesses 40 in the core 20. Around the exterior of the arcuate segments 36 there is provided a hard resilient tread portion 42 adhesively bonded to the arcuate surface of the segments 36, and having holes 44 extending therethrough in registration with the bores 37. Preferably, the tread portions 42 are made of hard resilient frictional material such as polyurethane plastic material or the like such that it will make a good frictional grip with the strip metal S, and at the same time be sufficiently resilient to be deformed under pressure.

A tread strip 46 of similar material is also adhesively bonded to the arcuate surface 30 so as to give the entire roll a smooth regular cylindrical surface of the same material.

In order to shear the strip S, three blades 48 are provided located in the grooves 24 as shown. The blades 48 are rectangular steel bars having four corners or edges 50, and provided with bores 52 extending therethrough which are preferably countersunk from both sides so that fastening screws 54 may be passed through the bores 52 in either direction, so that the blades 48 may be used either way round. The screws 54 pass through bores 52 and through the longer side wall 26 of the groove 24. The side walls 26 may be provided with threaded recesses for reception of the bolts 54, or alternatively, a portion of the core may be cut away to provide a recess as at 56 to permit the use of a threaded nut 58. In order to locate the blades 48 in the correct position and to support it during use, shims 60 may be provided both between the blade and the high side 28 of the groove 24, and also between the blade and the bottom of the groove 24 as shown. The blades will be so adjusted that the outer corners or edges can be located relative to the cylindrical surface of the tread 46.

Figure 4:
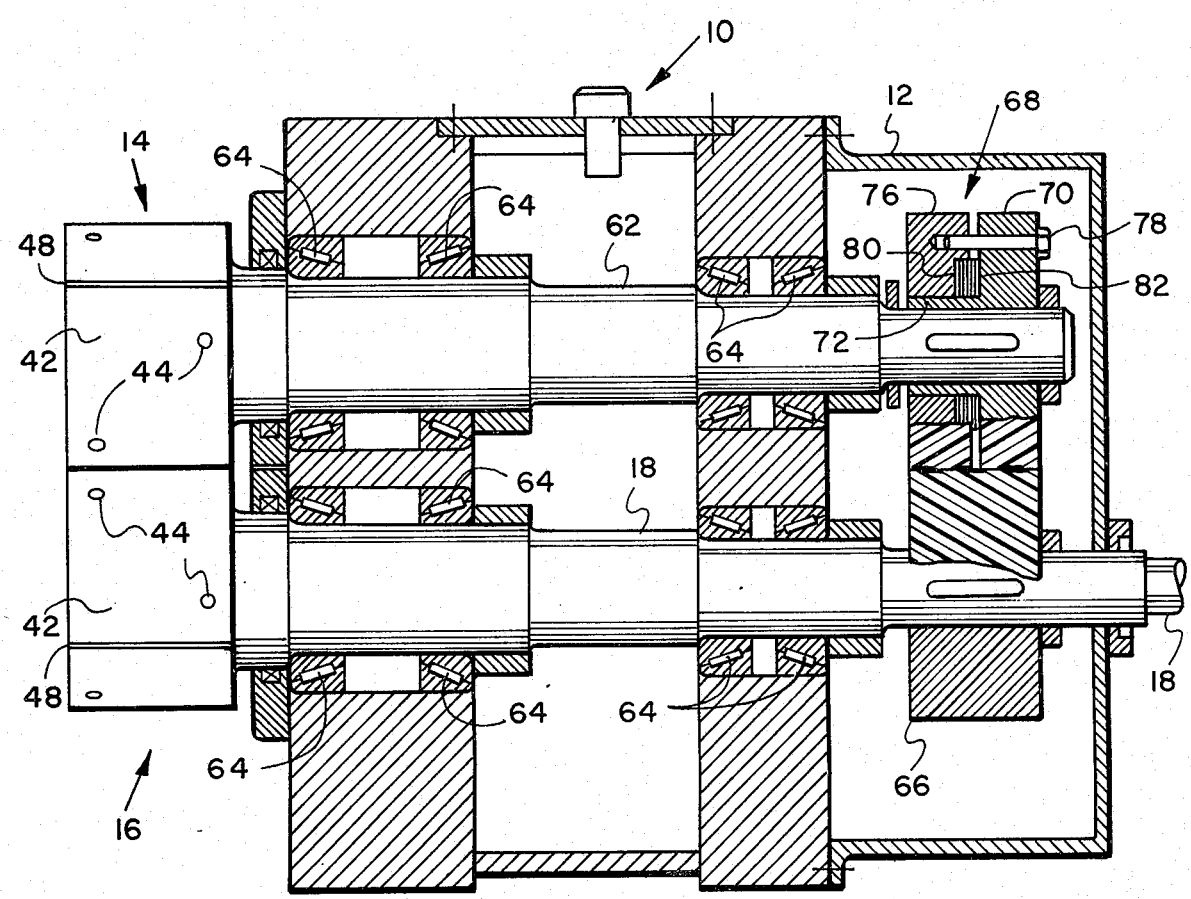
FIG. 4 is an enlarged sectional side elevation along the line 4—4 of FIG. 1, and, FIG. 5 is a cut away perspective illustration of a portion of the anti-backlash gearing system.
Figure 5:
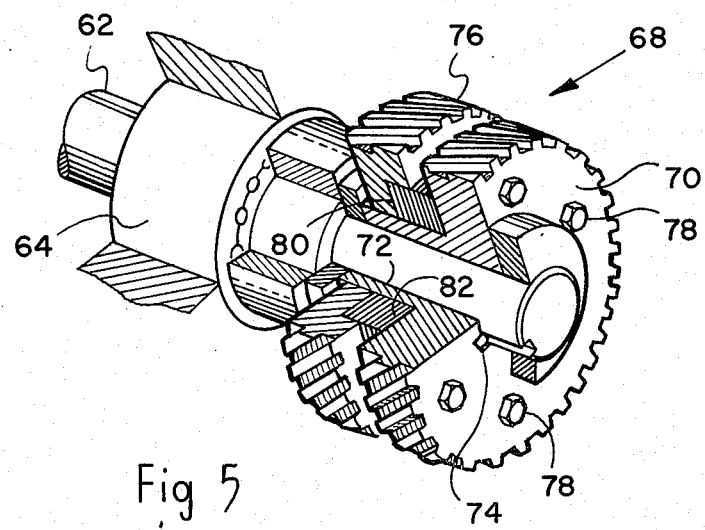

Referring now to FIGS. 4 and 5, it will be seen that the lower roll 16 is mounted on the drive shaft 18, and the upper roll 14 is mounted on a driven shaft 62. The drive shaft 18 is seen to extend completely through the housing 12 from one end to the other, and the driven shaft 62 is located within the housing and extends beyond the housing only to the left hand side thereof so that it may carry the other roll 14.

Both drive shaft 18 and driven shaft 62 are carried in suitable roller bearings 64, or any other suitable bearing means which are adequate for the purpose.

Mounted on drive shaft 18 is a helical drive gear 66 and mounted on driven shaft 62 is an anti-backlash gear indicated generally as 68, which is shown in more detail in FIG. 5. The anti-backlash gear 68 will be seen to comprise a fixed gear portion 70 having a sleeve 72 extending therefrom, and keyed to the shaft 62 by means for example a key 74. The fixed gear 70 will be seen to be formed with helical teeth, and is somewhat less than half the width of the gear 66. It is however of the same diameter and will have the same number of teeth so that both shafts 18 and 62 rotate in the same speeds in opposite directions.

A movable gear portion 76 is slidably located on the sleeve 72, and is adjustably fastened to the fixed gear 70 by means of the bolts 78 extending through the gear 70 and fastening in suitable threaded recesses in the gear 76.

The gear 76 is formed with an annular recess 80, and a spring 82 is located within the annular recess 80, and extends between the gear 76 and the gear 70, normally urging them apart from one another. The gear 76 is also formed with helical teeth and is of the same diameter and has the same number of teeth as the gear 70. The gear 76 is of slightly less than one half the width of the gear 66. In this way, when the chopper 10 is being installed, any backlash in the gears may be taken up by simply tightening up the bolts 78 thereby drawing the gear 76 towards the gear 70 and closing up the gap.

Once the backlash in the gear system is eliminated, then the positions of the blades 48 may be adjusted on the upper and lower rolls 14 so that they make a shear like engagement as shown in FIG. 3. Preferably, there will be substantially no clearance between the adjacent corners 50 of the blades 48 on the upper and lower rolls 14 and 16, and the adjacent corners 50 will in fact overlap one another so that there is a shearing action applied to the strip S as it passes between them.

The portions of the tread 46 adjacent to the blades 48 will be compressed by such overlapping engagement of the blades 48, and will then spring back again as the upper and lower rolls 14 and 16 continue to rotate. It will be noted however that while such compression is taking place, the continuous portion of the strip S, i.e., that portion which has not yet passed between the upper and lower rolls 14 is still subject to the gripping action of the portions of the tread 46 which are in contact therewith on both sides thereof, and are subject to the frictional action of the portions of the tread 46 which apply continuous traction to the portion of the strip S and thereby prevent it from becoming deflected away from the nip of the upper and lower rolls 14.

At the same time, since the adjacent corners 50 of the blades 48 are more or less flush with or very close to the surface of the tread 46, there is virtually no fan-like effect created by the blades 48 and therefore the tendency for the blades and rolls to set up disturbing air currents is greatly reduced.

In this way, the chopper rolls can be operated at greatly increased rotational speed, and can accommodate thinner sheet metal strips with a far greater degree of reliability than in the past.

When the corners 50 of the blades 48 become dull, all that is required is for the segments 36 to be removed, and the bolts 54 of the blades 48 are removed and the blades 48 are simply rotated around to locate another corner 50 in the operative position.

Any tendency for clearance to develop between the upper and lower blades 48 can be eliminated by inserting or removing shims between the blades 48 and the back wall 28, and by adjusting the anti-backlash gearing unit.

It will of course be appreciated that various changes can be made without departing from the scope of the invention. For example, the invention has been described specifically in relation to the use of three blades 48, this being a convenient number to arrange around a cylindrical rotor as shown, for the particular type of operation. However, it would of course be equally possible to provide merely a single blade or two blades or four blades, depending upon the size of the rotors, the speed of operation, and the nature of the material to be chopped up. Furthermore, the invention has been described specifically in relation to the chopping of thin strip sheet metal. It will however be equally applicable to the chopping of other strip materials for example paper, sheet plastic and the like.

The foregoing is a description of a preferred embodiment of the invention which is given here by way of example only. The invention is not to be taken as limited to any of the specific features as described but comprehends all such variations thereof as come within the scope of the appended claims.

What is claimed is:

1. A rotary chopper for strip sheet material, for chopping the strip thereof into shorter lengths, said chopper comprising;

upper and lower shaft members;

mounting means for supporting said upper and lower shaft members parallel with one another, and drive means for driving the same in unison in opposite directions;

a roll core member mounted on each said shaft member each said core member being of generally triangular shape in section, having three generally flat segment mounting surfaces, and three tread mounting corners;

a blade mounting surface formed at each said corner, being oriented to lie in a predetermined plane, the planes of the three said blade mounting surfaces intersecting at about the center of said triangular shape of said core member;

a chopper blade mounted on each said blade mounting surface, with an edge portion thereof extending outwardly beyond said tread mounting surface of said core member;

resilient tread means mounted on each of said corners, adjacent said projecting edge portion of said blade member;

three roll segment portions for each said core member each having generally flat interior mounting surfaces, and generally semi-cyindrical exterior tread mounting surfaces, attachment means for attaching a said segment portion on a said generally flattened surface of a said core member;

resilient tread means attached over said semi-cylindrical tread mounting surface of each said segment portion, said resilient tread portions on said segment portions being of the same thickness, and radius of curvature as the tread portions on said corners, whereby to define a cylindrical resilient tread surface, with said edge portions of said blade members lying on the periphery of said cylindrical surface, and said tread portions being resilient and deflectible, in response to pressure from a blade member of an adjacent core, whereby to permit an overlapping shearing action to take place between said blade members on adjacent said core members, whereby said resilient tread portions will provide a constant frictional gripping action on said strip during chopping.

2. A rotary chopper as claimed in claim 1 including adjustable fastening means for fastening said chopper blade in position on said blade mounting surfaces said fastening means permitting adjustment of the position of said blade relative to the tread whereby to adjust the overlap of said blade with another said blade and being concealed by said tread portions when the same are attached in position as aforesaid.

3. A rotary chopper as claimed in claim 1 including at least two cutting edges on each said chopper blade means, and releasable fastening means for fastening the same in position, said fastening means being releasable to permit changing from one said cutting edge to another of said blade means.

4. A rotary chopper as claimed in claim 1 including gear drive means linking said upper and lower shaft members for driving in opposite directions in unison as aforesaid, and adjustment means in said gear drive means for taking up back-lash in said gear drive means.

5. A rotary chopper as claimed in claim 4 wherein said gear means comprise a drive gear, and a driven gear, and wherein said driven gear comprises two gear portions namely a fixed gear disc having gear teeth around the periphery thereof, the periphery thereof having a width somewhat less than one-half the width of said drive gear, and a movable gear disc, having a toothed periphery having a width somewhat less than one-half the width of said drive gear, said movable gear disc being movable towards and away from said fixed gear disc, spring means urging said movable gear disc away from said fixed gear disc, and adjustable means for adjustably drawing said movable gear disc towards said fixed gear disc against said spring.

* * * * *